(12) United States Patent
Easton

(10) Patent No.: US 8,087,317 B2
(45) Date of Patent: Jan. 3, 2012

(54) INTERFACE SYSTEM FOR CONTROL LEVER

(75) Inventor: David Joseph Easton, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 1092 days.

(21) Appl. No.: 11/935,491

(22) Filed: Nov. 6, 2007

(65) Prior Publication Data

US 2009/0115558 A1    May 7, 2009

(51) Int. Cl.
*F16H 59/10*    (2006.01)
*F16H 59/74*    (2006.01)

(52) U.S. Cl. .......................................... 74/335; 477/99
(58) Field of Classification Search .................... 74/335; 477/99

See application file for complete search history.

(56) References Cited

U.S. PATENT DOCUMENTS

| 4,519,266 A | 5/1985 | Reinecke |
| 5,406,860 A | 4/1995 | Easton et al. |
| 5,729,007 A | 3/1998 | Taniguchi et al. |
| 2002/0047272 A1 | 4/2002 | Hiyama et al. |
| 2005/0121279 A1 | 6/2005 | Nakane et al. |

FOREIGN PATENT DOCUMENTS

| DE | 196 21 781 | 12/1996 |
| EP | 0075 693 | 4/1991 |
| EP | 1 529 990 | 5/2005 |
| EP | 1 191 222 | 3/2009 |

*Primary Examiner* — Edwin A Young

(57) ABSTRACT

The invention relates to an interface system for a vehicle having a starter motor and a transmission control lever. There is a need for such an interface system which senses control lever position and prevents starter motor operation unless the control lever is in a park position. The interface system includes a plurality of magnet members generating magnetic fields, and a plurality of magnetic sensors or Hall effect switches mounted to the lever so that movement of the lever causes the magnetic sensors to move through the magnetic fields. An interface circuit is connected to the starter motor and to the magnetic sensors. The interface circuit and the sensors cooperate to generate lever position signals. The interface circuit and the sensors also cooperate to prevent activation of the starter motor unless the lever is in its park position. Thus, the same lever position sensors are used by the transmission control system and are used to control operation of the starter.

10 Claims, 3 Drawing Sheets

INTERFACE SYSTEM FOR CONTROL LEVER

FIELD OF THE INVENTION

The present invention relates to an interface system for a control lever, such as a transmission control lever for a vehicle transmission.

BACKGROUND OF THE INVENTION

Tractors and other vehicles often have systems or mechanisms which prevent activation of the engine starter unless the transmission is disengaged. Such vehicles have required that the transmission and perhaps other drives be in a disengaged condition, either by placing a control device in a neutral state or by disengaging a clutch, before electrical power can be supplied to the starter. This prevents sudden movement of the vehicle when the engine starts, potentially causing injury to people or damage to property.

In electronic transmission control systems, a small snap action switch has been used to prevent starter engagement unless the transmission control lever is in an appropriate position. This switch is not particularly reliable and is often difficult to design into compact transmission control devices. An alternative would be to have an electronic control unit read the transmission control sensing means and have it determine if starting is acceptable, but this requires that the control unit be powered during the start cycle. Such a requirement necessitates a more capable power supply for the microcontroller, adding expense and volume to the unit. Additionally, practical application of the snap action switch results in appreciable current being passed through the wires and connectors leading to the switch.

SUMMARY OF THE INVENTION

Accordingly, an object of this invention is to provide a transmission control lever interface which senses lever position and controls activation of the starter.

A further object of the invention is to provide such an interface which does not require the use of a microcontroller.

A further object of the invention is to provide such an interface which does not conduct large currents through the transmission control device.

A further object of the invention is to provide such an interface wherein the same lever position sensors are used by the transmission control system and are used to control operation of the starter.

These and other objects are achieved by the present invention, wherein an interface system is provided for a vehicle having a starter motor and a transmission control lever movable from a park position to a plurality of non-park positions. The interface system includes a plurality of magnet members generating magnetic fields, and a plurality of magnetic sensors or switches mounted to the lever so that movement of the lever causes the magnetic sensors to move through the magnetic fields. An interface circuit is connected to the starter motor and to the magnetic sensors. The interface circuit and the sensors cooperate to generate lever position signals, and to prevent activation of the starter motor unless the lever is in its park position. The magnet members have magnetic poles arranged to form a two-dimensional Gray code. The magnetic sensors are preferably three Hall effect switches in a linear alignment.

The interface circuit includes a starter relay connected between a battery and the starter motor, and a driver unit connected to a coil of the starter relay, to a start terminal of a key switch, and to the Hall effect switches through a diode and resistor array. Each diode has a cathode connected to a corresponding one of the Hall effect switches and an anode connected to an input of the driver unit. The magnet members are arranged so that the interface circuit generates a unique park signal when the lever is in its park position. The park signal is different from any signal generated when the lever is in a non-park position.

DESCRIPTION OF THE PREFERRED EMBODIMENT

Figure 1:
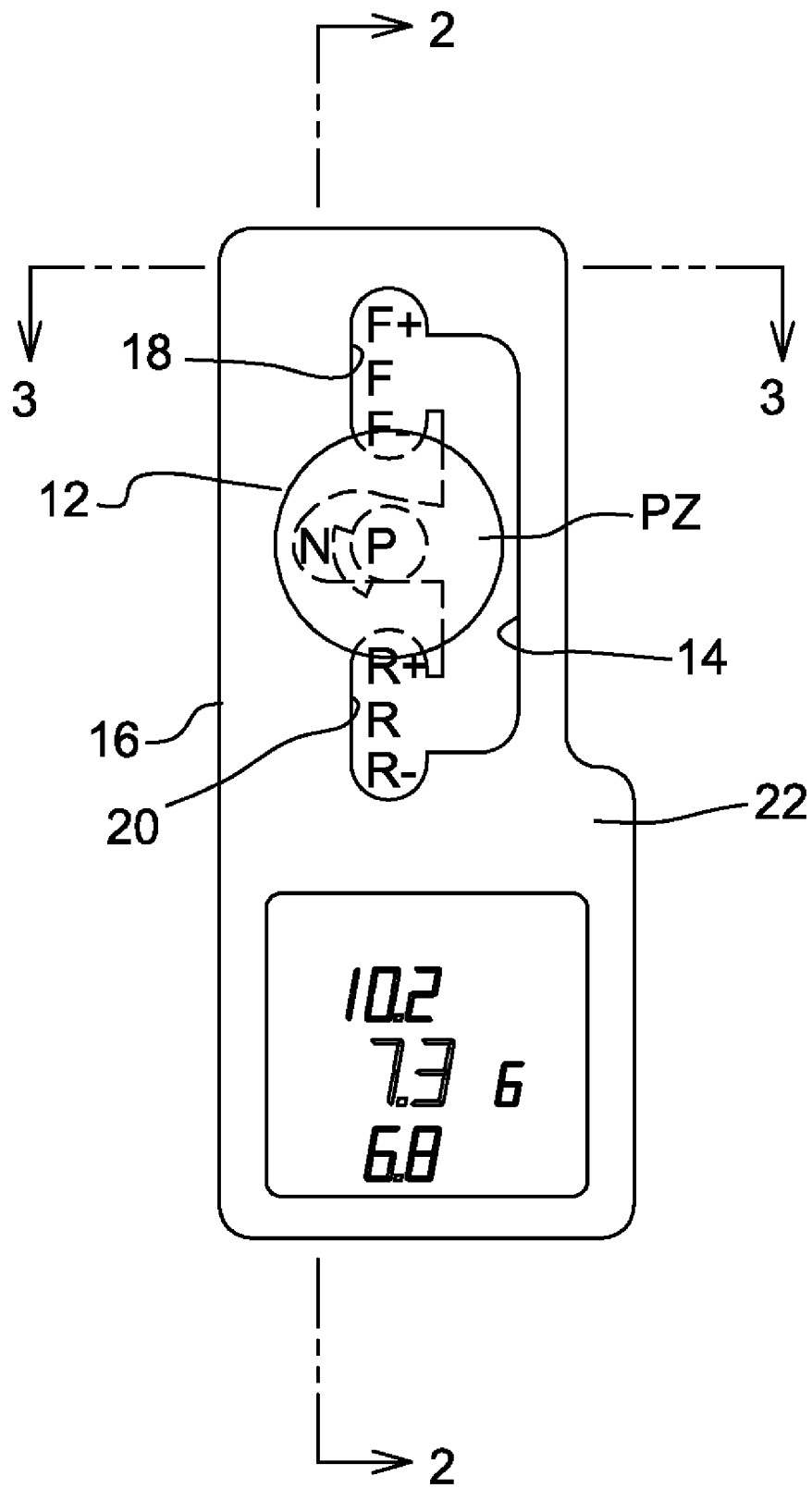
FIG. 1 is a top view of a transmission control lever assembly with which can be used the interface system according to the present invention.
Figures 2, 3:
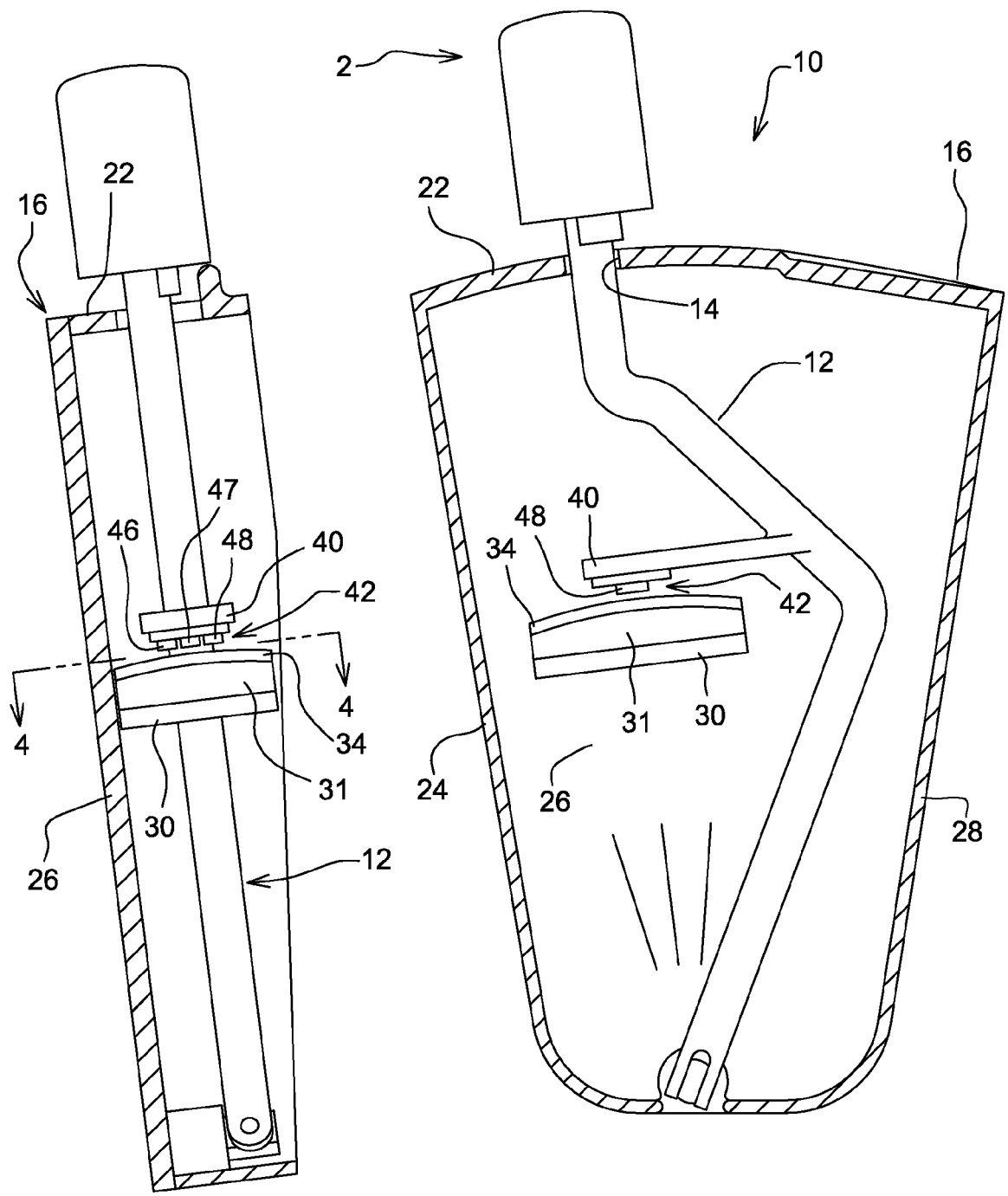
FIG. 2 is view in the direction of lines 2-2 of FIG. 1.
FIG. 3 is a view taken along lines 3-3 of FIG. 1.

Referring to FIGS. 1-3, a transmission control lever assembly 10 includes a lever 12 pivotally supported for movement in a guide slot 14 in a housing 16. As is well known the slot 14 includes a neutral position N and a park position P. The slot 14 also includes a forward sub-slot 18 having a forward speed increase position F+ and a forward speed decrease position F−, and a reverse sub-slot 20 having a reverse speed increase position R+ and a reverse speed decrease position R−. Thus, the lever 12 is movable from the park position P to a plurality of non-park positions.

The housing 16 has a top wall 22 attached to side walls 24, 26 and 28. A bracket 30 is fixed to the housing wall 26 and projects into the interior of the housing 16. The bracket 30 supports a magnet array support member 31 which has a partially spherical upper surface 32. A magnet array 34 of a plurality of magnet members 35 are mounted on the surface 32 of the bracket 30.

An arm 40 projects from the lever 12. A switch array 42 of magnetic switches is mounted on a lower surface 44 of the arm and adjacent to the magnet array 34. As best seen in FIGS. 1 and 3, the switch array 42 preferably includes three magnetic sensors or switches 46, 47 and 48. These switches are preferably commercially available Hall effect switches.

Figure 4:
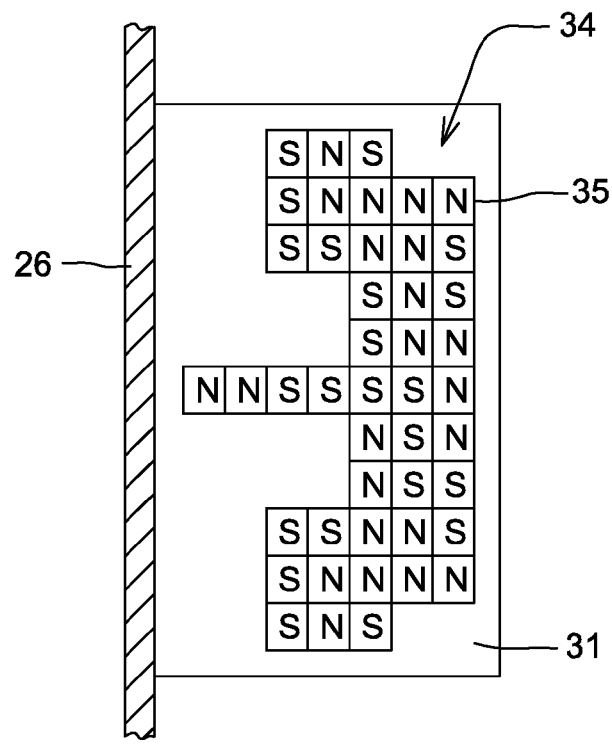
FIG. 4 is a view taken along lines 4-4 of FIG. 3.

Referring now to FIG. 4, there is shown one possible arrangement of the magnetic poles of the magnets 35 of array 34. In the example shown, magnets with symbol "N" have their north magnetic poles oriented upwards, and magnets with the symbol "S" have their south magnetic poles oriented upwards. The overall shape of the array 34 corresponds to the shape of the slot 14. Each of the switches 46-48 generates a logic 0 signal when adjacent to a magnet 35 which has its south magnetic pole oriented upwards. Each of the switches 46-48 generates a logic 1 signal when adjacent to a magnet 35 which has its north magnetic pole oriented upwards. Other magnet pole orientations are possible, as long as they cause the switches to generate equivalent logic signals as a function of their position relative to the magnet array 34. For example, the north and south poles reversed. This magnet array 34 comprises or corresponds to a two-dimensional Gray code.

With this arrangement of magnets 35 and magnetic switches 46-48, the three switches will be adjacent to and sense the corresponding magnets, depending upon the position of the lever 12 in the slot 16, the switches 46-48 will generate the following three digit codes:

| | |
|---|---|
| P | 000 |
| PZ | 001 |
| N | 110 |
| F | 011 |
| F+ | 010 |
| F− | 001 |
| R | 011 |
| R+ | 010 |
| R− | 001 |

Note that the park position P corresponds to a unique 3-bit code or park signal which is different from any code or signal generated when the lever is in a non-park position.

Figure 5:
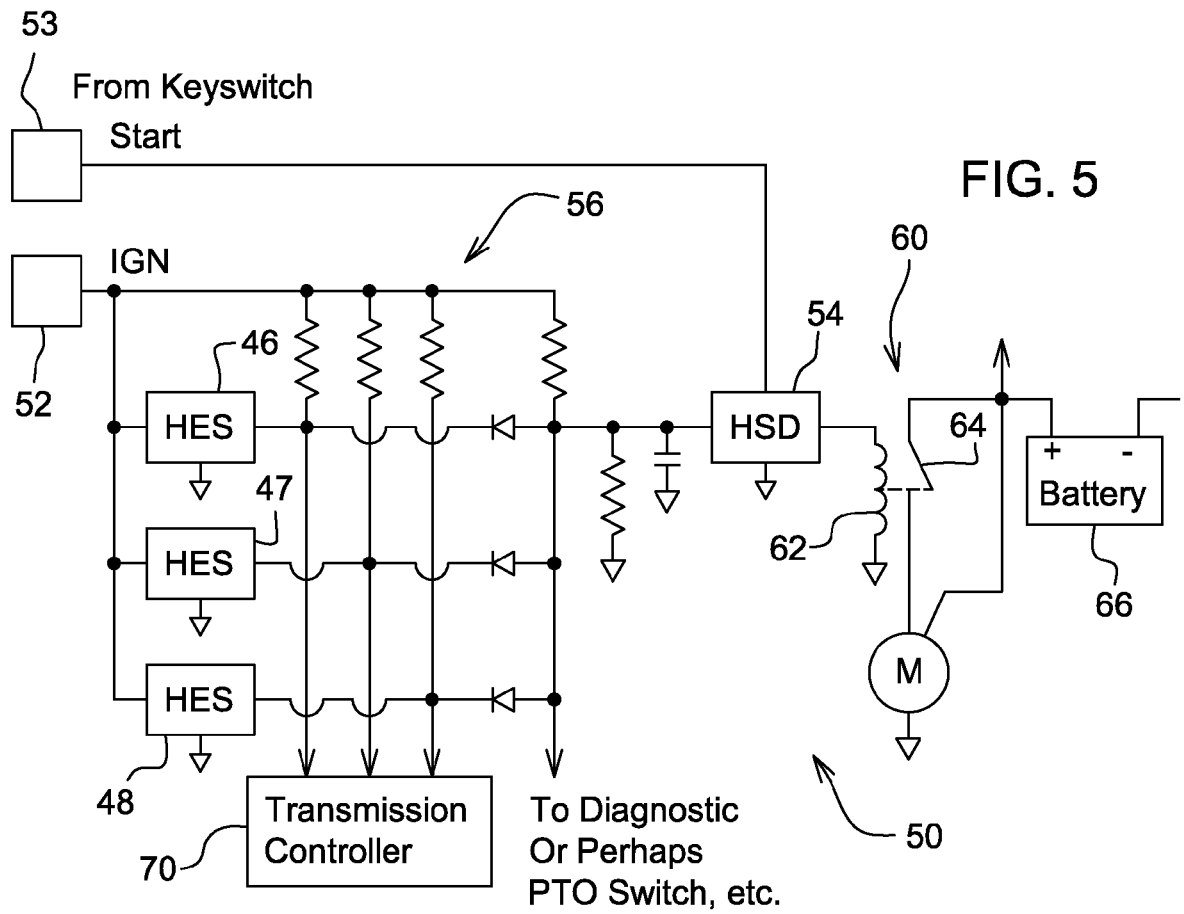
FIG. 5 is an electrical schematic of a circuit utilized with the interface system of FIGS. 1-4.

Referring now to FIG. 5, a signal processor or interface circuit 50 is connected to the magnetic switches 46-48. Switches 46-48 are connected to the ignition terminal 52 of the key switch (not shown) and to a high side driver 54 via an array 56 of resistors and an array of diodes 58. Each diode 58 has a cathode connected to a corresponding one of the Hall effect switches 46-48, and an anode connected to an input of the driver unit 54. The arrays 56 and 58 are connected to a transmission controller 70. The driver 54 is also connected to the start terminal 53 of the key switch (not shown). The driver 54 is also connected to the coil 62 of a relay 60 which operates a relay switch 64. Switch 64 is arranged between the battery 66 and the starter motor M. On output lines 70 the circuit 50 generates signals representing the position of the switches 46-48 relative to the magnet array 34. These signals can be transmitted to a transmission controller 70 which thereby controls the transmission (not shown) as a function thereof. The high side driver 54 may be placed remotely from the transmission control lever assembly 10, allowing only very small currents to be required within the assembly. The Hall effect switches 46-48 should be rated for voltages seen on the tractor, both maximum and minimum, and so that a separate power supply is not required.

As a result, only when the lever 12 is in its park position P, the circuit 50 allows energization of the relay coil 62 and thus closing of relay switch 64 and energization of the starter motor M.

The switches 46-28 together generate a 3 bit code as the lever 12 is moved, The code does not provide a unique value for each lever position, and thus some values are used several times throughout the range of lever motion. Yet, the switches can accurately sense all positions of the lever 12. However, a unique code is used for the park position of the lever 12 so that the starter can be engaged only when the lever 12 is in the park position. As a result, the same lever position sensors 46-48 are used by the transmission controller 70 and are used to control operation of the starter motor M.

The chosen code when the lever is in the Park position deactivates all three Hall effect switches 46-48 (noted as a value of 000), and this is the only lever position in which all three switches are simultaneously in this state. With the circuit 50, the start signal from the keyswitch 53 is allowed to pass through the high side driver 54 and to the starter M only when its input pin is not pulled to ground by one or more of the Hall effect switches 46-48. This occurs only when the lever 12 is in the Park position. All other positions of the lever 12 have at least one of the Hall effect switches 46-48 activated, and the high side driver 54 is turned off. Thus, the starter M will only be engaged when the keyswitch 53 is providing current to the high side driver 54 and the driver is 54 turned on by not having its input pulled to ground by a Hall effect switch 46-48.

Should one of the switches 46-48 fail in a state which improperly allows starting the engine, the transmission controller (not shown) will not see the 000 beginning state, and thus will not allow transmission operation. Conversely, if one of the switches fails shorted to ground, the tractor is not allowed to start. Sensor or circuit failure, either open or shorted, therefore does not allow the transmission to erroneously engage after engine startup.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. An interface system for a vehicle having a starter motor and a transmission control lever movable in a slot in a housing from a park position to a plurality of non-park positions, the interface system comprising
    a bracket fixed to the housing;
    a magnet array of magnet members mounted on the bracket, the magnet members have magnetic poles arranged to form a two-dimensional grey code;
    an arm projecting from the lever;
    a plurality of magnetic switches mounted to the lever so that movement of the lever causes the magnetic switches to move through the magnetic fields; and
    an interface circuit connected to the starter motor and to the magnetic switches, the interface circuit and the switches cooperating to generate lever position signals, the lever position signals including a park position signal which is different from any position signal generated when the lever is in a non-park position, the interface circuit and the switches cooperating to prevent activation of the starter motor unless the lever is in its park position.

2. The interface system of claim 1, wherein:
    the array of magnetic switches comprises at least three magnetic switches in a linear alignment.

3. The interface system of claim 1, wherein:
    the magnet members and the magnetic switches cause the interface circuit to generate a three bit code as the lever is moved in the slot.

4. The interface system of claim 1, wherein:
    the magnetic switches comprise Hall effect switches.

5. An interface system for a vehicle having a starter motor and a transmission control lever movable from a park position to a plurality of non-park positions, the interface system comprising:
    a plurality of magnet members generating magnetic fields, the magnet members have magnetic poles arranged to form a two-dimensional grey code;
    a plurality of magnetic sensors mounted to the lever so that movement of the lever causes the magnetic sensors to move through the magnetic fields; and
    an interface circuit connected to the starter motor and to the magnetic sensors, the interface circuit and the sensors cooperating to generate lever position signals, the interface circuit and the sensors cooperating to prevent activation of the starter motor unless the lever is in its park position.

6. The interface system of claim 5, wherein:
    the magnetic sensors comprise Hall effect switches.

7. The interface system of claim 5, wherein:
the magnetic sensors comprise Hall effect switches; and
the interface circuit comprises a starter relay connected between a battery and the starter motor, a driver unit connected to a coil of the starter relay, to a start terminal of a key switch, and to the Hall effect switches through a diode and resistor array.

8. The interface system of claim 5, wherein:
the magnet members are arranged so that the interface circuit generates a unique park signal when the lever is in its park position, said park signal being different from any signal generated when the lever is in a non-park position.

9. An interface system for a vehicle having a starter motor and a transmission control lever movable from a park position to a plurality of non-park positions, the interface system comprising:
a plurality of magnet members generating magnetic fields;
a plurality of magnetic sensors mounted to the lever so that movement of the lever causes the magnetic sensors to move through the magnetic fields, the magnetic sensors comprise three Hall effect switches arranged in a linear alignment; and
an interface circuit connected to the starter motor and to the magnetic sensors, the interface circuit and the sensors cooperating to generate lever position signals, the interface circuit and the sensors cooperating to prevent activation of the starter motor unless the lever is in its park position.

10. An interface system for a vehicle having a starter motor and a transmission control lever movable from a park position to a plurality of non-park positions, the interface system comprising:
a plurality of magnet members generating magnetic fields;
a plurality of magnetic sensors mounted to the lever so that movement of the lever causes the magnetic sensors to move through the magnetic fields, the magnetic sensors comprise Hall effect switches; and
an interface circuit connected to the starter motor and to the magnetic sensors, the interface circuit and the sensors cooperating to generate lever position signals, the interface circuit and the sensors cooperating to prevent activation of the starter motor unless the lever is in its park position, the interface circuit comprises a starter relay connected between a battery and the starter motor, a driver unit connected to a coil of the starter relay, to a start terminal of a key switch, and to the Hall effect switches through a diode and resistor array, the interface circuit also comprising a plurality of diodes, each diode having a cathode connected to a corresponding one of the Hall effect switches and an anode connected to an input of the driver unit.

* * * * *